Feb. 11, 1941.   H. G. DOLL   2,230,999
METHOD OF INDICATING SPONTANEOUS POTENTIALS IN SHALLOW WELLS
Filed Feb. 25, 1939
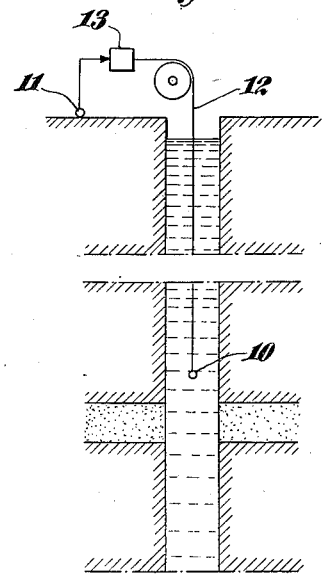
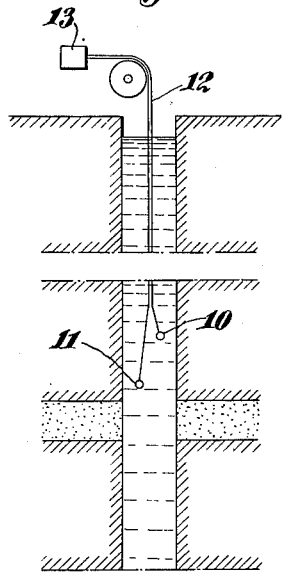
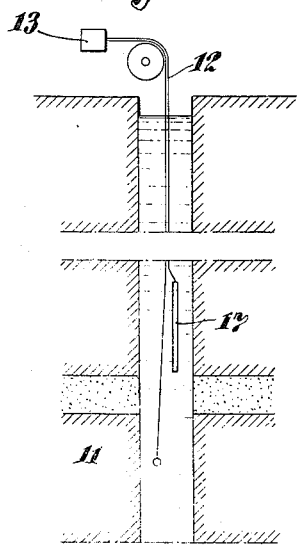
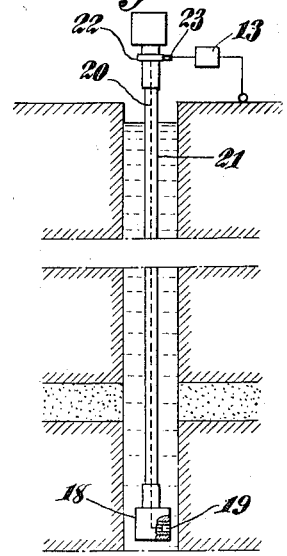
INVENTOR.
Henri Georges Doll,
BY
ATTORNEYS Patented Feb. 11, 1941

2,230,999

UNITED STATES PATENT OFFICE 2,230,999

METHOD OF INDICATING SPONTANEOUS POTENTIALS IN SHALLOW WELLS

Henri Georges Doll, Paris, France, assignor to Schlumberger Well Surveying Corporation, Houston, Tex., a corporation of Delaware Application February 25, 1939, Serial No. 258,364

7 Claims. (Cl. 175—182)

The present invention relates to a method for determining the nature of the strata traversed by a bore hole containing liquid. More particularly it relates to a method for determining the location of porous strata permeated with substantially fresh water, such as are encountered in wells of shallow depth.

In the present practice, the location of porous beds traversed by a drill hole is usually determined by measuring the spontaneous potentials existing at various depths in the bore hole. It has been found, however, that in certain cases, notably in wells of shallow depth, the magnitudes of the spontaneous potentials measured are relatively small, so that extremely sensitive instruments must be used in order to obtain accurate measurements.

The principal object of the present invention, accordingly, is to provide an improved method for determining the nature of strata traversed by a bore hole in which the magnitude of the spontaneous potentials existing within the bore hole may be substantially increased.

A further object of the invention is to provide a method of the above character in which an ionizable substance is added to the liquid or mud in the bore hole for the purpose of increasing the magnitude of the spontaneous potentials existing therein.

The spontaneous potentials encountered in wells are known to be the sum of several separate and distinct potentials, notably those due to electro-filtration and those due to electro-osmosis. Electro-filtration potentials arise when the liquid or mud in the well flows through the porous strata adjacent the bore hole, and are consequently a function of the pressure exerted by the column of liquid or mud present in the bore hole. In shallow wells, however, the height of the column of liquid or mud in the well is relatively small, so that the electro-filtration potentials are correspondingly small in magnitude.

The potentials due to electric-osmosis are known to depend on the relative difference in ion concentration between the fluid permeating the porous strata and the liquid or mud in the bore hole. In deep porous formations, the fluid in the porous formations is more or less confined and is strongly saline, whereas the liquid in the bore hole is usually a mixture of fresh water and clay whose salinity does not change to any appreciable extent during drilling. Hence, the relative difference in ion concentration between the fluid in the porous strata and the liquid or mud in the bore hole is relatively great, and the electro-osmotic potentials are correspondingly relatively large in magnitude.

In shallow wells, on the other hand, it has been found that the porous strata traversed by the well are permeated with water which is fresh or only slightly saline. This is apparently due to the fact that the fluid permeating strata close to the earth's surface circulates quite freely, and is not in contact with salt-bearing strata for extended periods of time. Moreover, the salt content of these strata has been considerably lowered by reason of the constant washing action of the circulating fresh water. Accordingly, in such wells the difference in ion concentration between the fluid permeating the porous strata and the liquid or mud in the well is small, and the electro-osmotic potentials are correspondingly small in magnitude.

In accordance with the invention, an ionizable substance is added to the liquid or mud contained in a well of shallow depth, for the purpose of increasing the difference in the relative ion concentration between the fresh or slightly saline water permeating the strata, and the liquid or mud contained in the bore hole. It has been found that, by increasing the difference in ion concentration, the electro-osmotic potentials may be substantially increased in magnitude, so that measurements of spontaneous potentials may be readily obtained where otherwise it would be necessary to use special instruments in order to obtain commercially accurate results.

It appears that the observed boundary potential between the fluid in the porous strata and the liquid in the bore hole depends primarily on the relative concentration of each ion in each solution, the relative velocity of each ion in solution, and the valence of each ion in solution. In general, the highest boundary potentials have been observed to occur when the liquid in the bore hole contains a relatively high concentration of positive and negative ions of very different mobility, and the fluid in the porous strata is low in ion concentration as, for example, is the case when fresh water is present.

Salts of the more active metals, such as the chlorides of sodium and lithium, and the sulphates of magnesium and copper, have been found to be especially satisfactory as addition agents for increasing the ion concentration in the liquid or mud contained in the drill hole. Likewise, solutions of the more active acids, such as hydrochloric acid, nitric acid and sulphuric acid, for example, have been found satisfactory for this purpose. Of these substances, sodium chloride is perhaps best adapted for use in the method of the invention because it is inexpensive, readily available everywhere and does not have any deleterious effects on the equipment used in practicing the method. It will be evident that many other substances may be used satisfactorily in the method, the only requirement being that they disassociate in solution to give two or more ions having different mobilities.

The amount of ionizable substance which should be added to the liquid or mud in the bore hole will depend on the salinity of the fluid permeating the porous strata in any given well. Thus, in many shallow wells, the fluid permeating the porous strata has been found to have a salt concentration of about .3 gram or less of sodium chloride per liter, corresponding to a resistivity of about 17 ohms per cubic meter at a temperature of 65° F. Satisfactory spontaneous potential measurements were obtained in such wells after the salinity of the liquid or mud in the bore hole had been increased to about 10 grams sodium chloride per liter, corresponding to a resistivity of about .63 ohm at a temperature of 65° F.

In general, the higher the concentration difference between the two fluids, the greater will be the magnitude of the spontaneous potentials measured. However, it has been found undesirable to increase the ion concentration in the liquid or mud contained in the bore hole beyond the point where the resistivity of the liquid or mud is less than about .5 ohm per cubic meter.

The addition of ionizable substances to the liquid or mud in the bore hole will be desirable, in general, whenever the depth of the well is not greater than the depth of the fresh water zone. Usually the fresh water zone is about 1500 feet deep although in the Texas gulf coast this depth has been found to be as low as about 500 feet. On the other hand, in other districts, such as Wyoming, for example, porous strata containing fresh water are sometimes found at a depth of about 3000 feet below the surface.

The addition of an ionizable substance to the liquid in the well has the effect of reversing the curve of spontaneous potentials obtained. This apparently results from the known fact that of two adjacent solutions having different ion concentrations, the one having the lower concentration is usually more negative. In deep wells, the ion concentration in the fluid permeating the porous strata is usually higher than that in the liquid contained in the well. In shallow wells treated in accordance with the present invention, however, the reverse is true. Here the liquid in the bore hole has the higher ion concentration, and porous strata are indicated by positive readings of spontaneous potentials.

The spontaneous potentials may be measured by any known apparatus, such as that illustrated in the accompanying drawing, in which:

Figure 1 is a schematic diagram of a single electrode circuit for measuring spontaneous potentials in wells;

Figure 2 shows a two-electrode circuit similar to Figure 1;

Figure 3 illustrates a modification of Figure 2 in which an elongated reference electrode is used; and Figure 4 shows apparatus for measuring spontaneous potentials during the course of drilling.

Referring to Figure 1, a single electrode measuring circuit is shown, which comprises an exploratory electrode 10 connected by a conductor 12 to an electrode 11 grounded at the earth's surface. A potential measuring or recording instrument 13 is provided in series with the conductor 12 for measuring the spontaneous potentials encountered as electrode 10 is moved through the bore hole.

In the modification shown in Figure 2 the ground electrode 11 may also be placed in the bore hole, close to the electrode 10, and both electrodes may be moved through the hole, the spontaneous potentials again being indicated by the measuring or recording instrument 13. If desired, the two electrodes may be spaced far apart, in which case the electrode 11 serves as an exploratory electrode, and an elongated electrode 17, from 100 to 200 feet long, for example, is provided as a reference point from which spontaneous potentials may be measured as both electrodes are moved in the well.

Measurements of spontaneous potentials may also be made during drilling by using the apparatus shown in Figure 4. Here, a special drill bit 18 is used which carries an insulated exploratory electrode 19, connected to the measuring or recording instrument 13 by a cable 20 within the drill stem 21 through a slip ring 22 engaging a brush 23. Apparatus of this character is shown in greater detail in copending application Serial No. 242,864, filed November 28, 1938, by Eugene G. Leonardon.

From the foregoing it will be evident that by increasing the relative difference in ion concentration between the fluid in the porous formations and the liquid in the bore hole, the magnitude of the spontaneous potentials occurring in shallow wells may be substantially increased, thus enabling measurements to be made readily with instruments of ordinary commercial sensitivity.

It will be understood that by increasing the ion concentration of the liquid in the bore hole, its electrical conductivity is increased and its electrical resistivity is decreased. Accordingly, the method of the invention may be alternatively expressed as increasing the relative difference in conductivity or resistivity between the fluid in the porous formations and the liquid in the bore hole.

While certain specified substances have been mentioned above as being satisfactory for use in practicing the method of the invention, many other suitable materials will suggest themselves to those skilled in the art. Moreover, the proportions recited above may be varied depending on the particular characteristics of any given well. Accordingly, the substances and proportions disclosed are to be regarded as examples, merely, and the invention is not to be limited in any way thereby except as defined in the following claims.

I claim:

1. The method of determining the nature of earth strata containing liquid of relatively low ion concentration traversed by a shallow bore hole containing liquid of relatively low ion concentration, which comprises the steps of increasing the ion concentration of the liquid in the bore hole above that of the liquid in the earth, and obtaining indications at different depths of the spontaneous potentials existing in the bore hole thereafter.

2. The method of determining the nature of earth strata containing liquid of relatively low ion concentration traversed by a shallow bore hole containing liquid of relatively low ion concentration, which comprises the steps of adding an ionizable substance to the liquid in the bore hole to increase its ion concentration above that of the liquid in the earth, and obtaining indications at different depths of the spontaneous potentials existing in the bore hole thereafter.

3. The method of determining the nature of earth strata containing liquid of relatively low electrical conductivity traversed by a shallow bore hole containing liquid of relatively low electrical conductivity, which comprises the steps of adding an electrolyte to the liquid in the bore hole to increase its electrical conductivity above that of the liquid in the earth, and obtaining indications at different depths of the spontaneous potentials existing in the bore hole thereafter.

4. The method of determining the nature of earth strata containing liquid of relatively low ion concentration traversed by a shallow bore hole containing liquid of relatively low ion concentration, which comprises the steps of increasing the relative difference in ion concentration between the liquid in the bore hole and the fluid in the adjacent porous strata, and obtaining indications at different depths of the spontaneous potentials existing in the bore hole thereafter.

5. The method of determining the nature of earth strata containing liquid of relatively low ion concentration traversed by a shallow bore hole containing liquid of relatively low ion concentration, which comprises the steps of adding an ionizable substance to the liquid in the bore hole to decrease its resistivity to not less than about .5 ohm per cubic meter at a temperature of 65° F., and obtaining indications at different depths of the spontaneous potentials existing in the bore hole thereafter.

6. The method of determining the location of porous strata permeated with substantially fresh water, traversed by a shallow bore hole containing liquid of relatively low ion concentration, which comprises the steps of adding an electrolyte to the liquid in the bore hole to decrease its resistivity to about .63 ohm per cubic meter at a temperature of 65° F., and obtaining indications at different depths of the spontaneous potentials existing in the bore hole thereafter.

7. The method of determining the location of porous strata permeated with substantially fresh water, traversed by a shallow bore hole containing liquid of relatively low ion concentration, which comprises the steps of adding sodium chloride to the liquid in the bore hole to increase its salt concentration to about 10 grams per liter, and obtaining indications at different depths of the spontaneous potentials existing in the bore hole thereafter.

HENRI GEORGES DOLL.